US011897094B2

(12) United States Patent
Schultz

(10) Patent No.: US 11,897,094 B2
(45) Date of Patent: Feb. 13, 2024

(54) POWERED RATCHETING WRENCH

(71) Applicant: MILWAUKEE ELECTRIC TOOL CORPORATION, Brookfield, WI (US)

(72) Inventor: Kyle W. Schultz, Grafton, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 566 days.

(21) Appl. No.: 16/736,162

(22) Filed: Jan. 7, 2020

(65) Prior Publication Data

US 2020/0215666 A1 Jul. 9, 2020

Related U.S. Application Data

(60) Provisional application No. 62/789,082, filed on Jan. 7, 2019.

(51) Int. Cl.
*B25B 21/00* (2006.01)
*B25B 23/16* (2006.01)
*B25B 13/46* (2006.01)

(52) U.S. Cl.
CPC .......... *B25B 21/004* (2013.01); *B25B 13/465* (2013.01); *B25B 23/16* (2013.01)

(58) Field of Classification Search
CPC ...... B25B 21/004; B25B 13/465; B25B 23/16
USPC ......................................................... 81/57.13
See application file for complete search history.

(56) References Cited

U.S. PATENT DOCUMENTS 3,650,336 A * 3/1972 Koehler ............... B25D 16/003 173/110
4,974,475 A * 12/1990 Lord ..................... B25B 21/004 81/57.13
6,058,815 A * 5/2000 Habermehl ............... B25F 3/00 81/177.1
6,742,418 B2 * 6/2004 Amami ............... B25B 23/1427 81/57.39
6,789,448 B2 * 9/2004 Ono ...................... B25B 13/465 81/57.39
6,813,977 B2 * 11/2004 Goodhue ................ B25B 23/06 81/433
7,926,585 B2 * 4/2011 Pozgay ................... B25B 21/00 173/39
9,120,213 B2 * 9/2015 Elger .................... B25B 21/004
9,321,154 B2 * 4/2016 Chen ....................... B25B 21/02
11,260,209 B2 * 3/2022 Siciliano ........... A61M 37/0015
11,338,413 B2 * 5/2022 Zhao ..................... B25B 13/462

* cited by examiner

*Primary Examiner* — Hadi Shakeri
(74) *Attorney, Agent, or Firm* — Michael Best & Friedrich LLP

(57) ABSTRACT

A powered ratcheting wrench includes a main housing defining a grip portion, a motor having a motor drive shaft, a drive assembly coupled to the motor drive shaft and driven by the motor, and an output assembly coupled to the drive assembly. The output assembly includes an output member that receives torque from the drive assembly, causing the output member to rotate about an axis. The powered ratcheting wrench further includes a head housing coupled to the main housing and supporting at least a portion of the drive assembly. The head housing is composed of an aluminum alloy resulting in a center of gravity for the power tool to be proximate the grip portion.

22 Claims, 4 Drawing Sheets

POWERED RATCHETING WRENCH

CROSS-REFERENCE TO RELATED APPLICATIONS

This application claims priority to U.S. Provisional Patent Application No. 62/789,082 filed Jan. 7, 2019, the entire content of which is incorporated herein by reference.

FIELD OF THE INVENTION

The present invention relates to power tools, and more particularly to powered ratcheting wrenches.

BACKGROUND OF THE INVENTION

Powered ratcheting wrenches typically include a motor, a drive assembly driven by the motor, and a rotating output for applying torque to a fastener. The motor may be powered by electricity (e.g., a DC or AC source) or pressurized air.

SUMMARY OF THE INVENTION

In one aspect, the invention provides a powered ratcheting wrench including a main housing defining a grip portion, a motor having a motor drive shaft, a drive assembly coupled to the motor drive shaft and driven by the motor, and an output assembly coupled to the drive assembly. The output assembly includes an output member that receives torque from the drive assembly, causing the output member to rotate about an axis. The powered ratcheting wrench further includes a head housing coupled to the main housing and supporting at least a portion of the drive assembly. The head housing is composed of an aluminum alloy resulting in a center of gravity for the power tool to be proximate the grip portion.

In another aspect, the invention provides a powered ratcheting wrench including a main housing defining a grip portion, a motor having a motor drive shaft rotatable about a first axis, a drive assembly coupled to the motor drive shaft and driven by the motor, and an output assembly coupled to the drive assembly. The output assembly includes an output member that receives torque from the drive assembly, causing the output member to rotate about a second axis that is perpendicular to the first axis. The powered ratcheting wrench further includes a head housing coupled to the main housing and supporting at least a portion of the drive assembly. The head housing is composed of an aluminum alloy resulting in a center of gravity of the wrench that is enveloped by the hand of a user when being grasped by a user.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
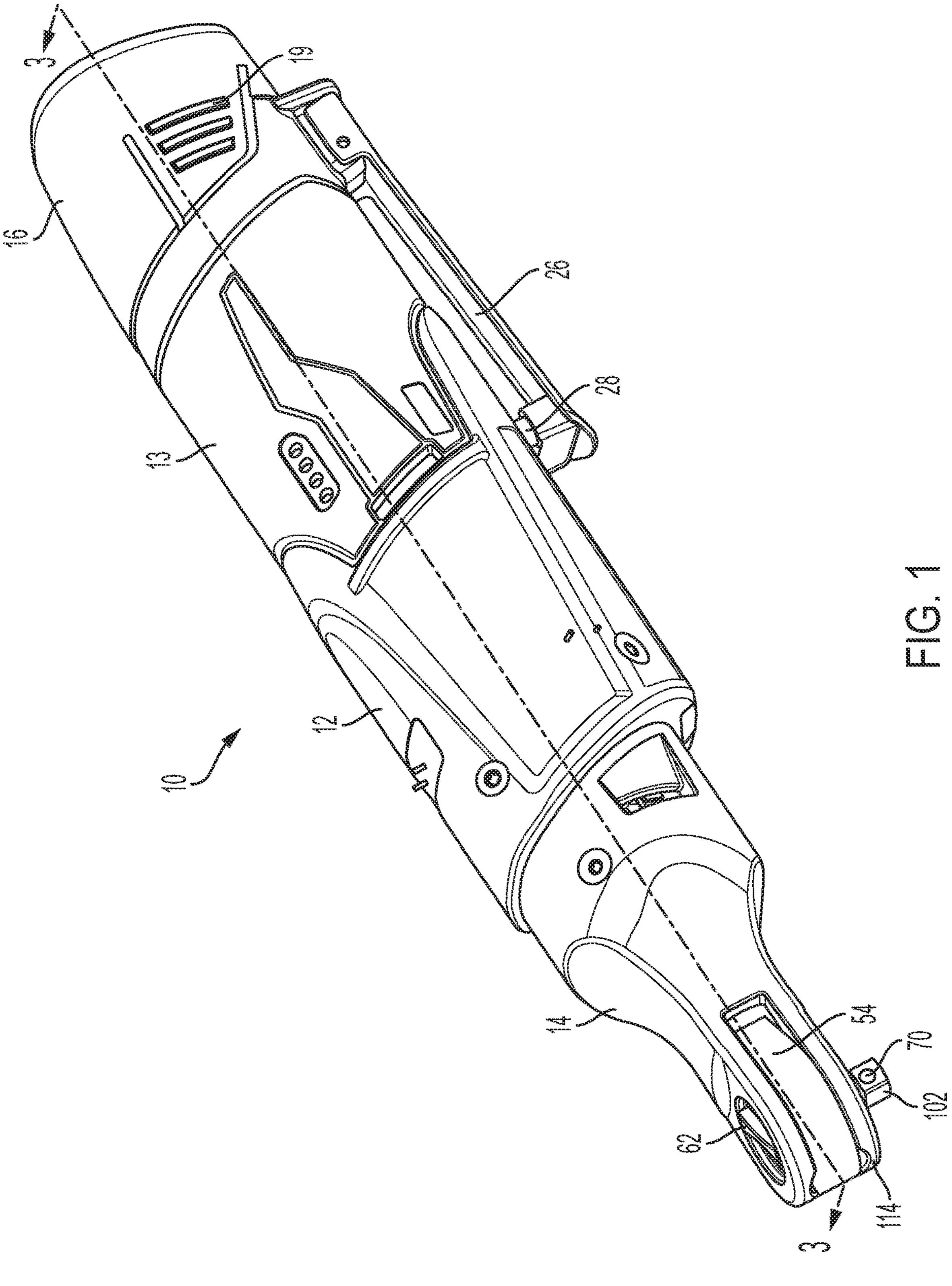
FIG. 1 is a perspective view of a powered ratcheting wrench in accordance with an embodiment of the invention.

FIG. 1 illustrates a battery-powered hand-held ratcheting wrench 10. The wrench 10 includes a main housing 12, which has a grip portion 13 graspable by an operator to maneuver the wrench 10, a head housing 14 coupled to the main housing 12, and a battery pack 16 attached to the main housing 12. The battery pack 16 is a removable and rechargeable 12-volt battery pack and includes three (3) Lithium-ion battery cells. In other constructions, the battery pack may include fewer or more battery cells such that the battery pack is a 14.4-volt battery pack, an 18-volt battery pack, or the like. Additionally or alternatively, the battery cells may have chemistries other than Lithium-ion such as, for example, Nickel Cadmium, Nickel Metal-Hydride, or the like.

The battery pack 16 is inserted into a cavity 17 in the main housing 12 in the axial direction of axis A (FIG. 2) and connects with the main housing 12 adjacent the grip portion 13. The battery pack 16 includes a latch 19 (FIG. 1), which can be depressed to release the battery pack 16 from the wrench 10. In other constructions, the wrench 10 includes a cord and is powered by a remote source of power, such as an AC utility source connected to the cord. In another construction, the wrench 10 may be a pneumatic tool powered by pressurized air flow through a rotary air vane motor, not shown. In this construction, instead of the battery pack 16 and an electric motor 18, the wrench 10 includes a rotary air vane motor (not shown) and a connector (not shown) for receiving pressurized air. In other constructions, other power sources may be employed.

Figure 2:
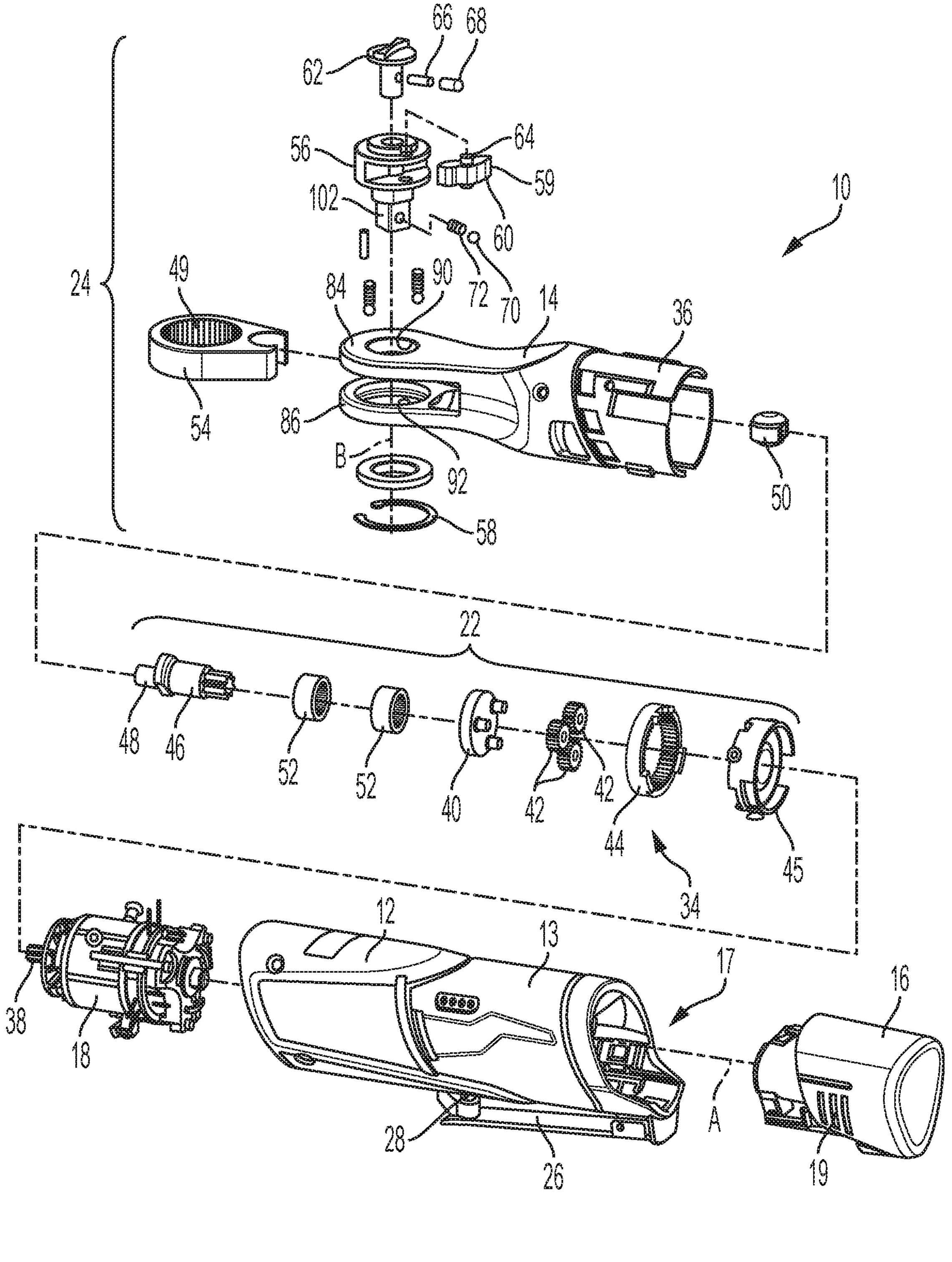
FIG. 2 is an exploded view of the powered ratcheting wrench of FIG. 1.

With reference to FIG. 2, the wrench 10 includes a motor 18, a motor drive shaft 20 extending from the motor 18 and centered about the axis A (FIG. 3), and a drive assembly 22 coupled to the drive shaft 20 (FIG. 2) for driving an output assembly 24. The output assembly 24 defines a central axis B substantially perpendicular to axis A. In other embodiments of the torque wrench 10, the output assembly 24 may alternatively be adjustable (e.g., pivotable) relative to the main housing 12 such that the axis B may be perpendicular, obliquely angled, or parallel to the axis A. As illustrated in FIGS. 1 and 2, the wrench 10 also includes an actuator, such as a paddle 26, for actuating an electrical switch 28 to electrically connect the motor 18 to the battery pack 16.

Figure 3:
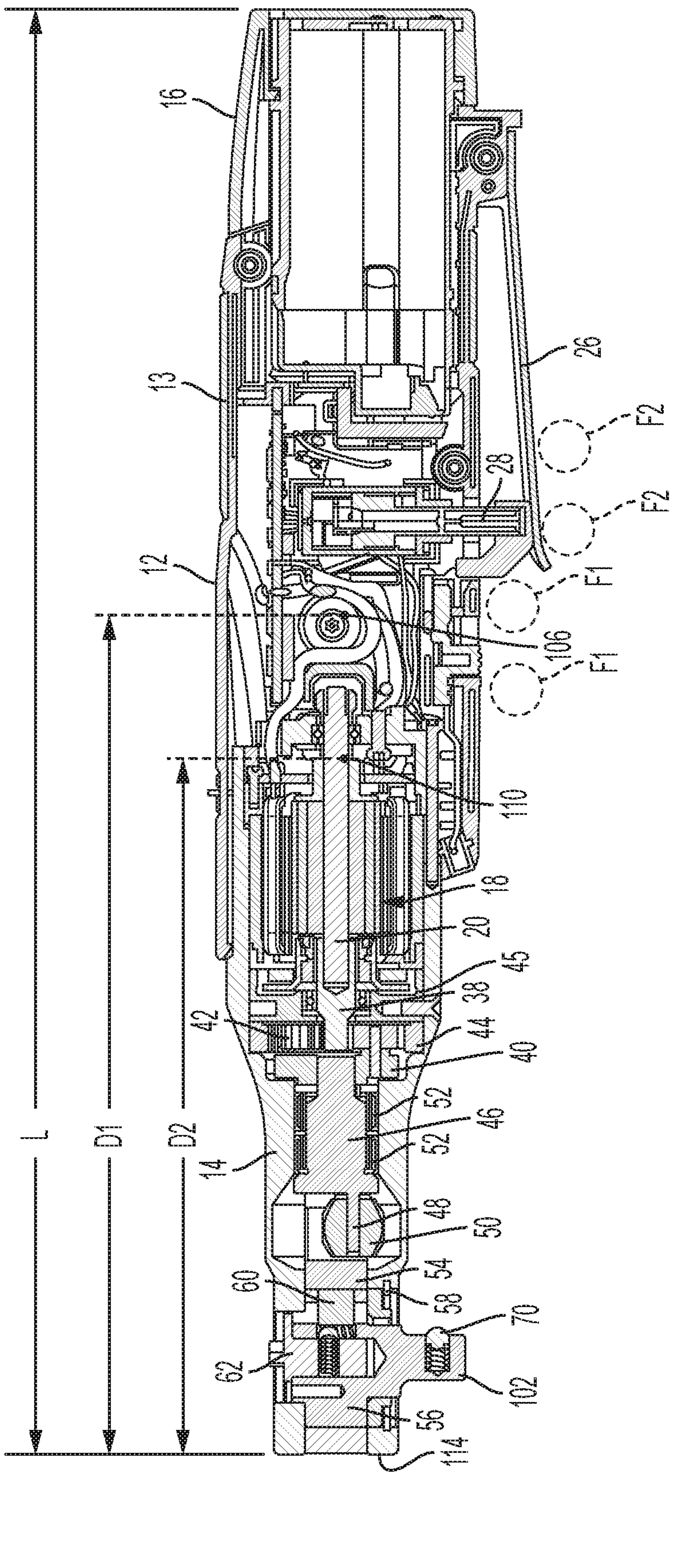
FIG. 3 is a cross-sectional view of the powered ratcheting wrench along line 3-3 of FIG. 1.

With reference to FIGS. 2 and 3, the drive assembly 22 includes a planetary geartrain 34 positioned between the motor 18 and the output assembly 24, and located within a gear housing portion 36 of the head housing 14. The planetary geartrain 34 includes a sun gear 38 coupled for co-rotation with the motor drive shaft 20, a planet carrier 40, three planet gears 42 rotatably supported upon the carrier 40, and a ring gear 44 fixed within the gear housing 36. Accordingly, torque received from the motor 18 is increased by the planetary geartrain 34, which also provides a reduced rotational output speed compared to the rotational speed of the motor drive shaft 20. The motor 18 is rotationally fixed to the main housing 12 via a motor bracket 45.

The drive assembly 22 also includes a crankshaft 46 having an eccentric member 48, a drive bushing 50 on the eccentric member 48, and two needle bearings 52 supporting the crankshaft 46 for rotation in the head housing 14. With reference to FIGS. 2 and 3, the output assembly 24 includes a yoke 54 and an anvil 56 rotatably supporting the yoke 54 within the head housing 14. The anvil 56 includes an output member 102, such as a square head for receiving sockets. Specifically, the output member 102 of the illustrated embodiment is a ⅜-inch output member. In other embodiments, the output member 102 may be other sizes such as ¼-inch, ½-inch, or another suitable size. The anvil 56 is retained within the head housing 14 via a retaining ring 58.

The output assembly 24 also includes a pawl 60 pivotably coupled to the anvil 56 by a pin 64. The yoke 54, anvil 56, and a shift knob 62 are centered along the axis B. As shown in FIG. 2, the output assembly 24 also includes a spring 66 and spring cap 68 supported for co-rotation with the shift knob 62. To adjust the direction of rotation that torque is transferred though the output assembly 24, the shift knob 62 is rotated between two positions, causing the pawl 60 to pivot about the pin 64 (through sliding contact with the spring cap 68) between a first position where torque is transferred to the anvil 56 (by the yoke 54) in a clockwise direction of rotation, and a second position where torque is transferred to the anvil 56 in a counter-clockwise direction of rotation. A combination of at least the yoke 54 and the anvil 56 may comprise a ratchet mechanism. The output assembly 24 further includes a detent (e.g., a ball 70) and a spring 72 biasing the ball 70 outward for retaining sockets on the output member 102, as shown in FIG. 2.

With continued reference to FIGS. 2 and 3, the head housing 14 is formed from aluminum as one piece, as discussed in further detail below, and includes the gear housing portion 36 and spaced first and second ears 84, 86 between which the yoke 54 is received. The first ear 84 includes a first aperture 90 and the second ear 86 includes a second aperture 92. The first and second apertures 90, 92 are centered about the axis B. The yoke 54 is received between the first and second ears 84, 86 in a direction perpendicular to axis B. The anvil 56 is received in the first and second apertures 90, 92 and the shift knob 62 is received in the first aperture 90.

The output assembly 24 of the wrench 10 includes a single-pawl ratchet design. The pawl 60 is disposed between the first and second ears 84, 86. The yoke 54 is oscillated between a first direction and a second direction about axis B by the eccentric member 48. An inner diameter of the yoke 54 defined by an aperture includes teeth 49 (FIG. 2) that mate with angled teeth 59 of the pawl 60 when the yoke 54 moves in the first direction. The yoke teeth 49 slide with respect to the angled teeth 59 of the pawl 60 when the pawl 60 moves in the second direction opposite the first direction such that only one direction of motion is transferred from the yoke 54 to the output member 102. The shift knob 62 cooperates with the spring 66 and the spring cap 68 to orient the pawl 60 with respect to the pin 64 such that the opposite direction of motion is transferred from the yoke 54 to the output member 102 when the shift knob 62 is rotated to a reverse position. In other constructions of the wrench 10, the output assembly 24 may alternatively include a dual-pawl design.

With reference to FIG. 3, the head housing 14 is a single monolithic component formed from aluminum. In some embodiments, the head housing 14 is composed of an A380 aluminum alloy using a die casting process. As a result, the wrench 10 includes a center of gravity 106 proximate the grip portion 13 of the main housing 12. In some embodiments, the center of gravity 106 is located at a first distance D1 away from a distal end 114 of the wrench 10 opposite the battery pack 16, where the first distance D1 is between about 55% and about 60% of the overall length L of the wrench 10 (with the battery pack 16 attached). In the illustrated embodiment of the wrench 10, the first distance D1 is about 57% of the overall length L of the wrench 10 (with the battery pack 16 attached). In some embodiments, the first distance D1 is between about 170 millimeters and about 185 millimeters away from the distal end 114 of the wrench 10. In the illustrated embodiment of the wrench 10, the first distance D1 is approximately 175 millimeters away from the distal end 114. Thus, with placement of the user's hand on the grip region 13 such that at least the user's index and middle fingers F1 circumscribe the main housing 12 and the remaining fingers F2 placed on the paddle 26, the center of gravity 106 is approximately in the middle of the grip region 13, ensuring that the wrench 10 is balanced while being held by the user during a fastener driving operation.

In prior art powered ratcheting wrenches like the wrench 10 shown in FIG. 1, the head housing is composed of steel, which has a higher density than aluminum. The type of steel commonly used in such prior art head housings is a 42CrMo steel alloy, and an investment casting processes is typically used to form the steel head housing. In such prior art powered ratcheting wrenches with a steel head housing, the center of gravity 110 is located farther from the grip portion of the main housing compared to the center of gravity 106. Therefore, it is more likely that the center of gravity 110 is outside the envelope of a user's hand while grasping the wrench, causing an imbalance for which the user must compensate during a fastener driving operation, and possibly reducing the comfort and control with which the user can maneuver the wrench.

Specifically, the center of gravity 110 is located at a second distance D2 away from the distal end of the wrench, where the second distance D2 is between about 47% and about 53% of the overall length L of the wrench (with the battery pack attached). In a prior art wrench having proportions similar to the wrench 10 of FIG. 3, the second distance D2 is approximately 50% of the overall length L of the wrench (with the battery pack attached). In some embodiments, the second distance D2 is between about 145 millimeters and about 165 millimeters away from the distal end of the wrench. In a prior art wrench having proportions similar to the wrench 10 of FIG. 3, the second distance D2 is approximately 155 millimeters away from the distal end.

Figure 4:
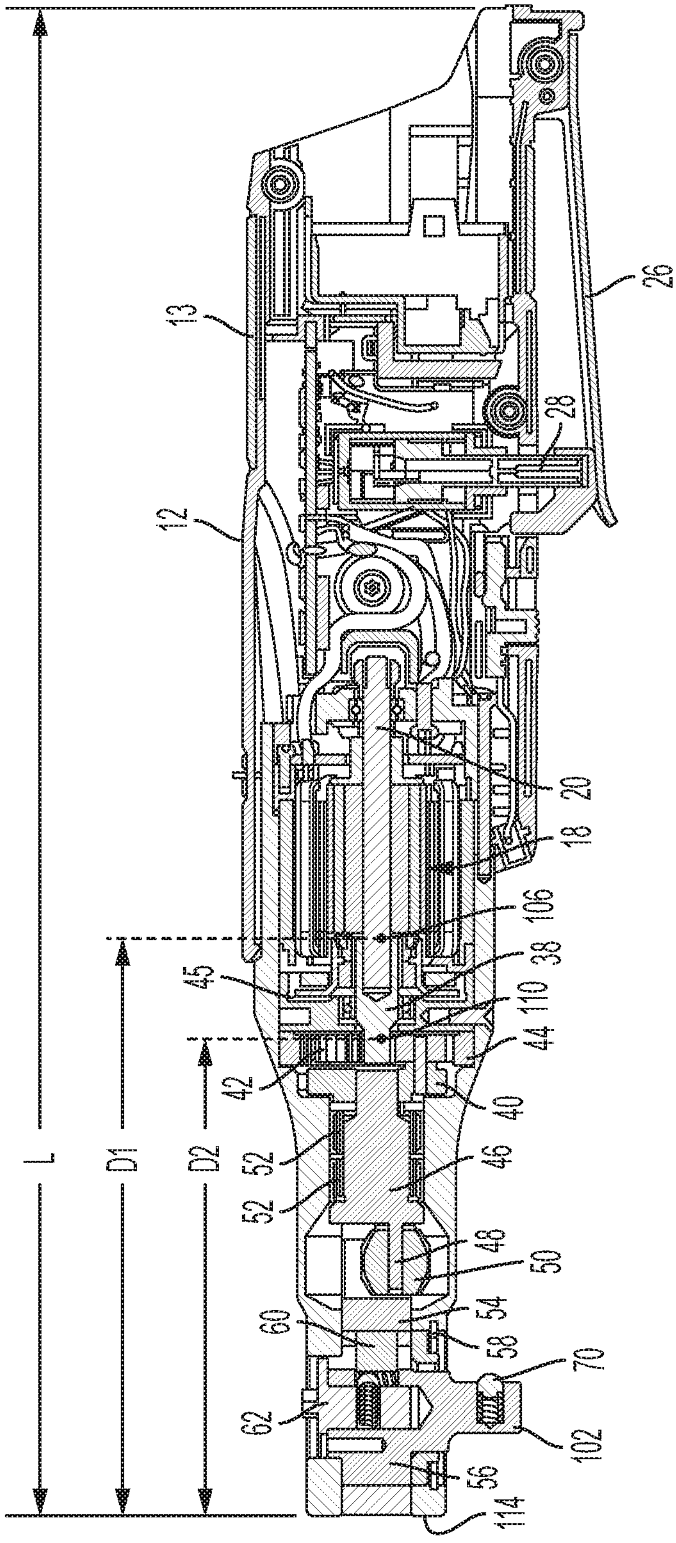
FIG. 4 is a cross-sectional view of the powered ratcheting wrench of FIG. 3, but without the battery pack.

With reference to FIG. 4, the center of gravities 106, 110 change when the battery pack 16 is removed; however, the first distance D1 nevertheless remains greater than the second distance D2. For example, the first distance D1 is between about 36% and about 40% of the overall length L of the wrench 10 (with the battery pack 16 removed). In the illustrated embodiment of the wrench 10, the first distance D1 is about 38% of the overall length L of the wrench 10 (with the battery pack 16 removed). In some embodiments, the first distance D1 is between about 102 millimeters and about 112 millimeters away from the distal end 114 of the wrench 10. In the illustrated embodiment of the wrench 10, the first distance D1 is approximately 107 millimeters away from the distal end 114.

In prior art powered ratcheting wrenches with a steel head housing, the center of gravity 110 is located at a second distance D2 away from the distal end of the wrench, where the second distance D2 is between about 31% and about 35% of the overall length L of the wrench (with the battery pack removed). In a prior art wrench having proportions similar to the wrench 10 of FIG. 4, the second distance D2 is approximately 33% of the overall length L of the wrench (with the battery pack removed). In some embodiments, the second distance D2 is between about 88 millimeters and about 98 millimeters away from the distal end of the wrench. In a prior art wrench having proportions similar to the wrench 10 of FIG. 4, the second distance D2 is approximately 93 millimeters away from the distal end.

As the inventor of the present application has discovered, by changing the material from which the head housing 14 is made from steel to aluminum, not only are material and manufacturing costs reduced, but the balance, control, and comfort of the wrench 10 when in use during a fastener driving operation is also improved because the center of gravity 106 is moved closer to the grip portion 13 of the main housing 12 where it is more likely to be enveloped by the user's hand. In contrast, in a prior art wrench having a steel head housing and proportions similar to the wrench 10 of FIG. 3, it is more likely that the center of gravity 110 will be outside the grip portion of the main housing, and thus outside the envelope of the user's hand (reducing balance, control, and comfort for the user).

In operation of the wrench 10, the user actuates the paddle 28, which activates the motor 18 to provide rapid bursts of torque to the output member 102, causing it to rotate, as the yoke 54 pivotably reciprocates about the axis A. In this manner, a fastener (e.g., a bolt or nut) can be quickly driven by the output member 102 to a seated position on a workpiece. After the fastener is seated on the workpiece, the user may release the paddle 28, thereby deactivating the motor 18. Alternatively, a control system of the wrench 10 may be configured to deactivate the motor 18 upon the fastener becoming seated on the workpiece without requiring the user to release the paddle 28. In either case, when the motor 18 is deactivated, the user may still impart a torque on the output member 102 and the fastener in response to manually rotating the wrench 10 about the axis B. At this time, the output member 102 becomes effectively rotationally locked to the head housing 14 (and therefore the housing 12) when the anvil 56 and connected pawl 60 back-drive the yoke 54 which, in turn, is unable to further back-drive the eccentric member 48 on the crankshaft 46.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered ratcheting wrench comprising:
a main housing defining a grip portion;
a motor having a motor drive shaft;
a drive assembly coupled to the motor drive shaft and driven by the motor about a first axis;
an output assembly coupled to the drive assembly, wherein the output assembly includes a ratchet mechanism and an output member, both of which receive torque from the drive assembly, causing the output member to rotate about a second axis;
a head housing coupled to the main housing and surrounding at least a portion of the drive assembly and at least a portion of the motor, wherein the head housing defines a first end of the wrench and the main housing defines an opposite, second end of the wrench; and
a battery pack selectively coupled to the main housing at the second end for providing power to the motor when activated,
wherein the head housing is composed of an A380 aluminum alloy resulting in a center of gravity of the wrench to be proximate the grip portion,
wherein the center of gravity is between 170 millimeters and 185 millimeters away from the first end when the battery pack is coupled to the main housing.

2. The powered ratcheting wrench of claim 1, wherein the head housing is coupled to the main housing with a series of fasteners extending through the main housing and the head housing.

3. The powered ratcheting wrench of claim 2, wherein the series of fasteners each extend toward the first axis in a direction perpendicular to the first axis.

4. The powered ratcheting wrench of claim 1, wherein the center of gravity is 175 millimeters away from the first end when the battery pack is coupled to the main housing.

5. The powered ratcheting wrench of claim 1, wherein the center of gravity is between 102 millimeters and 112 millimeters away from the first end when the battery pack is removed from the main housing.

6. The powered ratcheting wrench of claim 1, wherein the center of gravity is 107 millimeters away from the first end when the battery pack is removed from the main housing.

7. The powered ratcheting wrench of claim 1, wherein the second axis is perpendicular to the first axis.

8. The powered ratcheting wrench of claim 1, wherein the ratchet mechanism includes a yoke, and wherein the drive assembly includes a crankshaft for providing an oscillating input to the yoke for intermittently rotating the output member in a first rotational direction about the second axis.

9. The powered ratcheting wrench of claim 8, wherein the ratchet mechanism is adjustable for intermittently rotating the output member in a second rotational direction about the second axis in response to the oscillating input provided to the yoke.

10. The powered ratcheting wrench of claim 8, wherein the output member is rotationally locked by the yoke when the motor is deactivated and when the power tool is manually rotated about the second axis.

11. The powered ratcheting wrench of claim 1, wherein the head housing encases a planetary geartrain, a crankshaft, and a majority of the motor.

12. The powered ratcheting wrench of claim 1, further comprising a paddle to selectively activate the motor, wherein the paddle is disposed rearwardly of the center of gravity relative to the first axis when the battery pack is coupled to the main housing.

13. A powered ratcheting wrench comprising:
a main housing defining a grip portion;
a motor having a motor drive shaft rotatable about a first axis;
a drive assembly coupled to the motor drive shaft and driven by the motor, and an output assembly coupled to the drive assembly, wherein the output assembly includes a ratcheting mechanism and an output member, both of which receive torque from the drive assembly, causing the output member to rotate about a second axis that is perpendicular to the first axis;
a head housing coupled to the main housing and surrounding at least a portion of the drive assembly and at least a portion of the motor, wherein the head housing defines a first end of the wrench and the main housing defines an opposite, second end of the wrench; and
a battery pack selectively coupled to the main housing at the second end for providing power to the motor when activated,
wherein the head housing is composed of an A380 aluminum alloy resulting in a center of gravity of the wrench that is enveloped by the hand of a user when being grasped by a user, wherein the center of gravity is between 170 millimeters and 185 millimeters away from the first end when the battery pack is coupled to the main housing.

14. The powered ratcheting wrench of claim 13, wherein the head housing is coupled to the main housing with a fastener extending through the main housing and the head housing.

15. The powered ratcheting wrench of claim 14, wherein the fastener extends toward the first axis in a direction perpendicular to the first axis.

16. The powered ratcheting wrench of claim 13, wherein the center of gravity is 175 millimeters away from the first end when the battery pack is coupled to the main housing.

17. The powered ratcheting wrench of claim 13, wherein the center of gravity is between 102 millimeters and 112 millimeters away from the first end when the battery pack is removed from the main housing.

18. The powered ratcheting wrench of claim 13, wherein the center of gravity is 107 millimeters away from the first end when the battery pack is removed from the main housing.

19. The powered ratcheting wrench of claim 13, wherein the ratchet mechanism includes a yoke, wherein the drive assembly includes a crankshaft for providing an oscillating input to the yoke for intermittently rotating the output member in a first rotational direction about the second axis, wherein the ratchet mechanism is adjustable for intermittently rotating the output member in a second rotational direction about the second axis in response to the oscillating input provided to the yoke, and wherein the output member is rotationally locked by the yoke when the motor is deactivated and when the power tool is manually rotated about the second axis.

20. The powered ratcheting wrench of claim 13, wherein the head housing encases a planetary geartrain, a crankshaft, and a majority of the motor.

21. The powered ratcheting wrench of claim 13, further comprising a paddle to selectively activate the motor, wherein the paddle is disposed rearwardly of the center of gravity relative to the first axis when the battery pack is coupled to the main housing.

22. A powered ratcheting wrench comprising:

a main housing defining a grip portion;

a motor having a motor drive shaft;

a drive assembly coupled to the motor drive shaft and driven by the motor about a first axis;

an output assembly coupled to the drive assembly, wherein the output assembly includes a ratchet mechanism and an output member, both of which receive torque from the drive assembly, causing the output member to rotate about a second axis;

a head housing coupled to the main housing via a fastener extending through the head housing and the main housing, the head housing surrounding at least a portion of the drive assembly and at least a portion of the motor, wherein the head housing defines a first end of the wrench and the main housing defines an opposite, second end of the wrench; and a battery pack selectively coupled to the main housing at the second end for providing power to the motor when activated, wherein the head housing is composed of an A380 aluminum alloy resulting in a center of gravity of the wrench to be proximate the grip portion, wherein the center of gravity is between 170 millimeters and 185 millimeters away from the first end when the battery pack is coupled to the main housing.

* * * * *